United States Patent Office 3,629,226
Patented Dec. 21, 1971

3,629,226
CURABLE COMPOSITIONS OF MATTER
Friedrich Lohse, Allschwil, Rolf Schmid, Munchenstein, and Hans Batzer, Arlesheim, Switzerland, assignors to Ciba Limited, Basel, Switzerland
No Drawing. Filed Jan. 27, 1969, Ser. No. 794,382
Claims priority, application Switzerland, Jan. 31, 1968, 1,470/68; Sept. 5, 1968, 13,325/68
Int. Cl. C08g 45/14, 45/12
U.S. Cl. 260—835                       17 Claims

ABSTRACT OF THE DISCLOSURE

Compositions which can be converted to rubber-elastic plastic products on warming, characterised in that they contain long-chain polyester-polyamide-dicarboxylic acids of formula

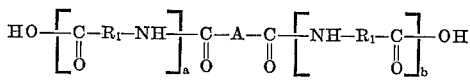

wherein $R_1$ represents a branched or unbranched alkylene residue having 2 to 11 carbon atoms in the linear chain, preferably the pentamethylene residue, and $a$ and $b$ denote zero or an integer, with the sum $(a+b)$ being at least 1 and at most 8, and wherein A denotes a branched or unbranched hydrocarbon chain interrupted by at least two ester groups

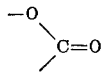

wherein, in the structural unit of the polyester residue A, the number of carbon atoms in hydrocarbon residues divided by the number of oxygen bridges is 3 to 32, wherein furthermore the total number of carbon atoms present in hydrocarbon residues in the residue A is at least 10, and wherein at least 1.0 and at most 7.0 equivalents of amide groups per kg. are present in the polyester-polyamide-dicarboxylic acid mentioned, and also diepoxide compounds, with 0.6 to 1.2, preferably 0.8 to 1.0, equivalents of carboxyl groups being present per 1 equivalent of epoxide groups.

---

It is known that cross-linked plastic products of high flexibility can be obtained by polyaddition of long-chain aliphatic dicarboxylic acids to polyepoxides, for example polyglycidyl ethers of bisphenol A. Here the rule applies that the flexibility of the products increases the greater the proportion of the aliphatic chains. The products however become appreciably softer and finally only show very poor mechanical strength with a moderate elongation at break.

It has now been found that novel plastic products which are distinguished by high extensibility and high strength and which show advantageous combinations of mechanical and physical properties for numerous technical applications are obtained by polyaddition of long-chain polyester-polyamide-dicarboxylic acids.

The incorporation of alternating structural elements of polyesters and polyamides into the macromolecule results in plastics which are soft and largely rubber-elastic and which have—for soft plastics—a surprisingly high strength and work of deformation. The long-chain dicarboxylic acids according to the invention which are used for the polyaddition must fulfill the following structural prerequisites: they must be built up of at least one aliphatic polyester segment and at least one polyamide segment corresponding to Formula I

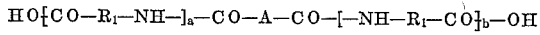
(I)

In Formula I, $a$ and $b$ represent small integers, and optionally $a$ or $b$ can=0, but more frequently $a=b$ and $a+b$ must be at least 1 and at most 8. $R_1$ denotes an alkylene residue which is optionally substituted by alkyl residues and which should have at least 2 and at most 11 carbon atoms in the straight chain, and in particular preferably the pentamethylene residue

The residue A denotes a residue, devoid of the terminal carboxyl groups, of an acid polyester of formula

HOOC—A—COOH         (II)

which must again fulfill certain structural prerequisites. In the broadest sense of the invention A is an aliphatic hydrocarbon residue interrupted by at least 2 ester groups, which should contain a total of at least 10 carbon atoms present in hydrocarbon residues, and at the same time the number of carbon atoms in hydrocarbon residues divided by the number of oxygen bridges is 3 to 32 in the structural unit of the said polyester.

However, polyesters in which the residue A is built up of branched or unbranched alkylene or alkenylene chains which alternate with carboxylic acid ester groups, and in which the quotient Z/Q, wherein Z denotes the number of carbon atoms in the main and side chains of the alkylene or alkenylene residue in the structural unit, that is to say the smallest recurring chemical grouping in the chain, and Q denotes the number of oxygen bridges in the structural unit, is 3 to 32, preferably 5 to 12, are preferred. Furthermore the total sum of the carbon atoms present in the alkylene and/or alkenylene residues in the polyester in question should advantageously be at least 25, preferably at least 40.

The polyester-polyamide-dicarboxylic acids of general Formula I are further subject to the condition that they contain at least 1.0 to at most 7.0 equivalents, preferably 1.0 to 6.0 equivalents, of amide groups per kg. of the acid (I).

The stoichiometric ratio of the reagents must furthermore be so chosen that 0.6–1.2, preferably 0.8–1.0, equivalents of carboxyl groups of the polyester-polyamide-dicarboxylic acid are employed per 1 equivalent of epoxide groups of the diepoxide compound.

The subject of the present invention is thus a process for the manufacture of elastomeric polyadducts characterised in that polyester-polyamide-dicarboxylic acids of formula

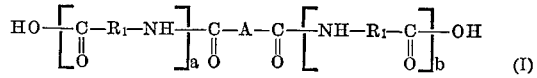
(I)

wherein $R_1$ represents a branched or unbranched alkylene residue having 2 to 11 carbon atoms in the linear chain, or preferably the pentamethylene residue, and $a$ and $b$ denote zero or an integer, with the sum $(a+b)$ being at least 1 and at most 8, and wherein A denotes a branched or unbranched aliphatic hydrocarbon chain which is interrupted by at least two ester groups

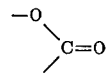

with the number of carbon atoms in hydrocarbon residues divided by hte number of oxygen bridges being 3 to 32 in the structural unit of the polyester residue A, and with the total number of carbon atoms present in the residue A of the hydrocarbon residues furthermore being at least 10, and with at least 1.0 and at most 7.0 equivalents of amide groups per kg. being present in the polyester-polyamide-dicarboxylic acid mentioned, are reacted with diepoxide compounds with warming, to form polyadducts, and in particular preferably reacted with such diepoxide compounds as have an epoxide equivalent weight of not more than 500, with 0.6 to 1.2, preferably 0.8 to 1.0, equivalents of carboxylic groups being employed per 1 equivalent of epoxide groups.

Preferably, the polyester-polyamide-dicarboxylic acids (I) used are those of formula

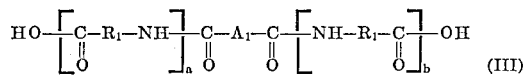 (III)

wherein the symbols $R_1$, $a$ and $b$ have the same significance as in Formula I and wherein $A_1$ denotes a polyester residue in which branched or unbranched alkylene and/or alkenylene chains alternate with carboxylic acid ester groups, with the quotient $Z/Q$, wherein Z is the number of carbon atoms present in hydrocarbon residues in the recurring structural element of the residue $A_1$ and Q is the number of oxygen bridges present in the recurring structural unit of the residue $A_1$ having to be 3 to 32 and preferably 5 to 12, and with the total number of carbon atoms present in alternating hydrocarbon residues in the residue $A_1$ having to be at least 25 and preferably at least 40, and with the polyester-polyamide-dicarboxylic acid (III) mentioned containing at least 1.0 and at most 6.0 equivalents of amide groups per kg.

Suitable diepoxide compounds are especially the N,N'-diglycidyl compounds derived from heterocyclic nitrogen bases, such as N,N'-diglycidylhydantoins, which are excellently compatible with polyamide-dicarboxylic acids.

Further, diglycidyl ethers or diglycidyl esters of formula

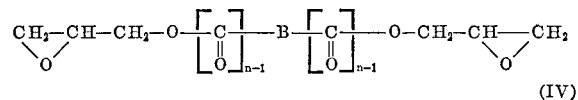

(IV)

wherein B denotes a bivalent aliphatic, cycloaliphatic, araliphatic or aromatic residue and $n$ denotes the number 1 or 2 are used as diepoxide compounds.

The plastics according to the invention possess some significant advantages compared to natural and synthetic rubber, in that they can be surprisingly well processed by the casting or impregnating process. This makes it possible to manufacture well-adhering coatings or castings around metal articles. The plastics contain no oxidisable double bonds and have an unusually high strength for soft plastics.

The cured shaped articles possess an increased resistance to creep and behave in a rubber-elastic manner above the crystallisation transition temperature, whilst for example the corresponding thermoplastic polyamides pass into the liquid state.

The hardness and above all the resilience of the shaped articles can be improved by increasing the density of cross-linking. This is preferably achieved by adding a polycarboxylic acid anhyydride with apropriately cross-linking addition of diepoxide compound, a tricarboxylic acid and/or a triepoxide compound.

When using a polycarboxylic acid anhydride as the cross-linking agent, 0.1 to 0.7, preferably 0.2 to 0.3, mol of a dicarboxylic acid anhydride are as a rule employed per 1 equivalent of carboxyl group of the dicarboxylic acid, as well as adding 0.1 to 0.8, preferably 0.2 to 0.3, epoxide group equivalent of the diepoxide compound in excess of the amount required for the reaction with the dicarboxylic acid, as a cross-linking agent for the polyadduct chain.

When using a triepoxide as the cross-linking agent, 0.1 to 0.5, preferably 0.1 to 0.3, equivalent of epoxide groups of the triepoxide compound are as a rule employed per 1 equivalent of epoxide groups of the diepoxide compound, with the corresponding excess of polyamide-polyester-dicarboxylic acid having to be used, that is to say the 0.6 to 1.2 equivalents of carboxyl groups of the polyamide-dicarboxylic acid which are employed then relate to one epoxide equivalent of the mixture of diepoxide and triepoxide.

The use of more than 50 mol percent of cross-linking agent relative to the carboxyl group equivalent of the dicarboxylic acid should as a rule be avoided since this in general leads to moulding materials of lower elongation at break as a result of the great increase in the density of cross-linking.

It is advantageous first to mix the dicarboxylic acid and anhydride before adding the diepoxide and to warm the mixture for a short time (for example 15 minutes at 150° C.) in order to esterify hydroxyl end groups which may be present by adding anhydride, with the formation of ester-carboxylic acids.

However it has to be pointed out that a slight cross-linking results even without additional cross-linking agent so that the shaped articles which have been fully cured in this way are also no longer fusible.

The synthesis of the polyester-polyamine-dicarboxylic acids of Formula I which have been described can be performed in the following ways:

The acid polyesters (II) which are employed are manufactured according to the known processes of melt condensation or catalytic esterification with azeotropic distillation. The lengthening of the chain, with simultaneous incorporation of the requisite amide groups, can take place according to the following processes:

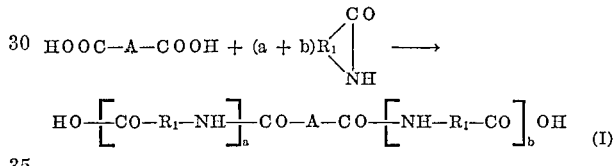

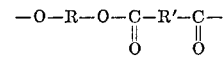 (I)

wherein HOOC—A—COOH=acid polyester (II).

The acid polyester employed as the middle section is mixed with the amount of lactam required depending on the desired chain length or the desired content of amide groups per kg. of end product, and in particular preferably with ε-caprolactam, and is allowed to react for 5 to 17 hours, advantageously 8 to 12 hours, at 200 to 220° C. under nitrogen. After completion of the reaction the lactam has been largely consumed. The small unreacted amounts of about 2 to 5% by weight can be removed by sublimation or distillation but can also be left in the crude product without impairing the properties of the cured end products.

The dicarboxylic acids of Formula II used for the manufacture of the polyamide-polyester-dicarboxylic acids are acid polyesters having two terminal carboxyl groups such as are above all obtained by polycondensation of aliphatic dicarboxylic acids with aliphatic diols. In the simplest case one is dealing with diesters having terminal free carboxyl groups, such as are obtained by condensation of 1 mol of a suitable glycol such as ethylene glycol and 2 mols of a suitable aliphatic dicarboxylic acid such as adipic acid. Ethylene glycol diadipate or ethylene glycol disebacate may for example be mentioned.

In these acid diesters of simple structure the structural unit according to the definition is the grouping $$-O-R-O-\underset{\underset{O}{\|}}{C}-R'-\underset{\underset{O}{\|}}{C}-$$

wherein R is the hydrocarbon residue of the glycol and R' the hydrocarbon residue of the dicarboxylic acid.

The acid polyesters of formula HOOC—$A_1$—COOH (V) which are preferentially employed however contain more than two ester groups: the chain of such polyesters is built up of the alternating basic building block of the dicarboxylic acid as well as of the alternating basic building block of the diol. The recurring structural unit, that is to say the smallest recurring chemical grouping in the chain, is then represented by the two basic building blocks from the dicarboxylic acid and from the dialcohol, joined together by an ester bond, and possesses the formula

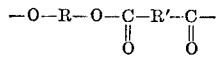

wherein R denotes the hydrocarbon residue of the diol and R' the hydrocarbon residue of the dicarboxylic acid.

The dicarboxylic acid and the diol for the synthesis of the acid polyester must at the same time always be chosen in such a way that the sum of the number of carbon atoms of the dicarboxylic acid minus 2 and of the number of carbon atoms of the diol divided by the two oxygen bridge atoms of the structural element is at least 3 and at most 32 and preferably at least 5 and at most 12. An acid polyester from for example succinic acid and ethylene glycol, wherein the sum of the carbon atoms in the dicarboxylic acid minus 2 and in the diol (=4) divided by the oxygen bridges (=2) is 2 is therefore unsuitable for the purposes of the invention. As a rule at least one of the two basic building blocks should contain at least 4 carbon atoms in the hydrocarbon residue.

In order to manufacture the preferred polyesters of formula $HOOC-A_1-COOH$ (V) the molar ratio of the aliphatic dicarboxylic acid and the aliphatic dialcohol must furthermore be so chosen for the polycondensation that the sum of the total number of carbon atoms occurring in hydrocarbon residues in the alternating structural units of the polyester chain produced is at least 25 and preferably at least 40. As aliphatic dicarboxylic acids having at least 4 C atoms in the hydrocarbon residue which can preferentially serve for the synthesis of such acid polyesters there may be mentioned: adipic acid, methylglutaric acid, dimethylglutaric acid, trimethyladipic acid, pimelic acid, suberic acid, azelaic acid, sebacic acid, nonanedicarboxylic acid, decanedicarboxylic acid, undecanedicarboxylic acid, dodecanedicarboxylic acid, allylsuccinic acid, dodecylsuccinic acid and dodecenylsuccinic acid.

As aliphatic diols having at least 4 C atoms which can preferentially serve for the synthesis of the acid polyesters in question there may be mentioned: 1,3-butanediol, 1,4-butanediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,6-dihydroxy-2,2,4-trimethylhexane, and 1,6-dihydroxy-2,4,4-trimethylhexane.

When using a higher dicarboxylic acid such as adipic acid or sebacic acid for the synthesis of the acid polyester it is also possible to use a lower aliphatic diol such as for example ethylene glycol, 1,2-propanediol or 1,3-propanediol. Conversely, when using a higher diol such as 1,6-hexanediol or 1,10-decanediol for the synthesis of the acid polyester, it is also possible to use a lower aliphatic dicarboxylic acid such as for example succinic acid, glutaric acid, maleic acid, fumaric acid or itaconic acid. However strict attention must always be given, when combining the dicarboxylic acid and diol, that the condition according to which the quotient $Z/Q$ must always be at least 3 is fulfilled.

The preferentially used acid polyesters thus correspond as a rule to the formula

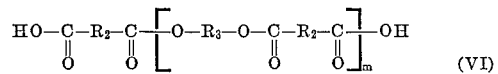

wherein $R_2$ and $R_3$ denote branched or unbranched alkylene or alkenylene chains, with each of the two residues $R_2$ and $R_3$ having to contain at least such a number of carbon atoms that the sum of the carbon atoms in $R_2$ and $R_3$ is together at least 6 and at most 64, and wherein the number $m$ is so chosen that the product of $m$ and the sum (C atoms in $R_2$+C atoms in $R_3$) is at least 25.

It is however also possible to use acid polyesters which are manufactured by condensation of a suitable dicarboxylic acid with a mixture of two or more suitable diols or conversely by condensation of a suitable diol with a mixture of two or more suitable dicarboxylic acids in the correct stoichiometric proportion. It is of course also possible to manufacture acid polyesters by condensation of mixtures of different dicarboxylic acids with mixtures of different diols, always provided that the conditions postulated above for the quotient $Z/Q$ and the total number of carbon atoms in the polyester chain remain observed.

The acid polyesters which can be obtained by addition of $(c+d)$ mols of a latcone to 1 mol of an aliphatic dicarboxylic acid in accordance with the reaction equation $(c+d)$

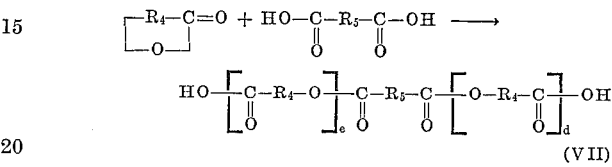

(VII)

wherein $R_4$ denotes an alkylene chain having at least 3 and at most 32 and preferably at least 5 and at most 12 carbon atoms, $R_5$ represents an aliphatic hydrocarbon residue and the number $c$ and $d$ are so chosen that the product of $(c+d)$ and the sum (C atoms in $R_4$) is at least 25 are furthermore suitable for the purposes of the invention.

In this class of compounds the alternating structural unit is identical with the recurring structural element in the chain and thus the structural element contains a single oxygen bridge. The quotient $Z/Q$ in this case thus becomes equal to the number of carbon atoms in the hydrocarbon residue of the lactone from which the acid polyester is built up.

The addition product of $(c+d)$ mols of ε-caprolactone or exaltolide (=lactone of 15-hydroxyheptadecane-acid) to 1 mol of succinic acid, adipic acid or sebacic acid may for example be mentioned.

A possible lactam for the manufacture of the polyamide-polyester-dicarboxylic acid (I) is in the first place ε-caprolactam. The polyamide-polyester-dicarboxylic acids derived from ε-caprolactam on reaction with the diepoxide compounds yield elastomeric polyadducts having particularly outstanding technical properties.

Other lactams of formula

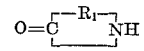

are for example β-propiolactam (=azetidinone-2), γ-valerolactam (=piperidone-2), ω-oenantholactam, ω-caprylolactam, ω-pelargonolactam, ω-caprilactam, ω-aminoundecane-acid-lactam, ω-lauric-lactam as well as their derivatives substituted by alkyl groups, for example 4,4-dimethylazetidinone-2. The substituents should not be present on the N-atom of the lactam.

Traces of water can at times suffice as catalysts. A second synthetic route consists of the following polycondensation reaction:

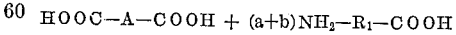

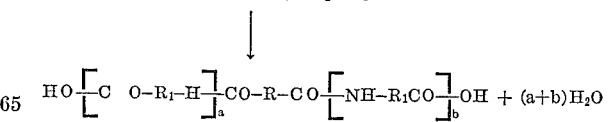

The acid polyester is condensed with $(a+b)$ mols of ω-aminocarboxylic acids at 180 to 200° C. under nitrogen until no further water is split off. The content of amide groups per kg. and the molecular weight of the end product can be adjusted in this manner, analogously to the synthesis described above.

Possible starting substances are *a*) acid polyesters: the same as those in the first synthetic route, and *b*) ω-aminocarboxylic acids: the saponified lactams mentioned in the first synthetic route, above all ω-aminocaproic acid and furthermore 11-aminoundecane-acid.

The syntheses of the acid polyesters frequently yield products which show a certain content of alcoholic hydroxyl groups. Further alcohol groups also appear to be liberated on reacting the acid polyesters with lactams or ω-aminocarboxylic acids through decomposition or ami-

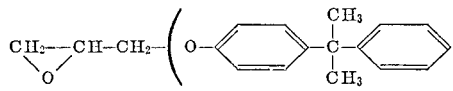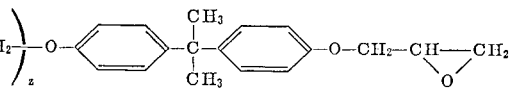

dation reactions, so that the end products which are employed for the curing of the epoxide resins are no longer pure polyester-polyamide-dicarboxylic acids but also contain products with terminal alcohol groups. As a result of the admixture of anhydrides to the resin/curing agent mixture these products are also, as desired, incorporated into the three-dimensional cross-linked end product.

The polyester-polyamide-dicarboxylic acids described are new compounds for which protection is here also claimed.

Possible diepoxides which are reacted in the process according to the invention with the polyester-polyamide-dicarboxylic acids of Formula I are especially those of not too high a molecular weight and in particular, as a rule, diepoxides having an epoxide equivalent weight of not greater than 500. Diepoxides of relatively low molecular weight, especially those with an epoxide equivalent weight of about 100 to 250, are in general particularly suitable for the manufacture of elastomeric products.

Suitable diepoxides are for example alicyclic diepoxides such as vinylcyclohexene dioxide, limonene dioxide, dicyclopentadiene diepoxide, bis-3,4-(epoxycyclohexylmethyl)adipate, (3',4'-epoxycyclohexylmethyl)-3,4-epoxycyclohexylmethyl)-3,4-epoxy-cyclohexanecarboxylate, 3',4'-epoxy-6'-methyl-cyclohexylmethyl-3,4-epoxy-6-methylcyclohexanecarboxylate, 3-(3',4'-epoxycyclohexyl)-2,4-dioxaspiro(5,5)-8,9-epoxy-undecane, 3-(glycidyloxyethoxyethyl)-2,4-dioxaspiro(5,5)-8,9-epoxy-undecane and 3,9-bis-(3',4'-epoxycyclohexyl)-spirobi(meta-dioxane).

Further possibilities are basic polyepoxide compounds such as are obtained by the reaction of primary aromatic monoamines such as aniline or toluidine or of secondary aromatic diamine such as 4,4'-di-(methylamine)-diphenylmethane with epichlorhydrin in the presence of alkali.

Preferably, diglycidyl ethers or diglycidyl esters, and especially N,N'-diglycidyl compounds derived from heterocyclic nitrogen compounds, are used. Possible diglycidyl esters which can be reacted in the process according to the invention with the dicarboxylic acids of Formula I are especially those which are accessible by reaction of a dicarboxylic acid with epichlorhydrin or dichlorhydrin in the presence of alkali. Such diesters can be derived from aliphatic dicarboxylic acids such as succinic acids, adipic acid or sebacic acid, from aromatc dicarboxylic acids such as phthalic acid, isophthalic acid or terephthalic acid, or especially from hydroaromatic dicarboxylic acid, such as tetrahydrophthalic acid, hexahydrophthalic acid or 4-methyl-hexahydrophthalic acid. Diglycidyl phthalate, diglycidyl terephthalate, diglycidyl tetrahydrophthalate and diglycidyl hexahydrophthalate may for example be mentioned.

As diglycidyl ethers which can be reacted with the dicarboxylic acids of Formula I in the process according to the invention, those which are accessible by etherification of a dihydric alcohol or diphenol with epichlorhydrin or dichlorhydrin in the presence of alkali are especially used. These compounds may be derived from glycols such as ethylene glycol, diethylene glycol, triethylene glycol, 1,3-propylene glycol, 1,4-butanediol, 1,5-pentanediol, 1,6-hexanediol, nitrogen-containing dialcohols such as N-phenyl-diethanolamine and especially from diphenols such as resorcinol, pyrocatechol, hydroquinone, 1,4-dihydroxynaphthalene, bis(p - hydroxyphenyl) - methane, bis-(p-hydroxyphenyl)-methylphenyl-methane, bis-(p-hydroxyphenyl)-tolylmethane, 4,4'-dihydroxy-diphenyl, bis-(p-hydroxyphenyl)-sulphone or preferably 2,2-bis-(p-hydroxyphenyl)-propane.

The diglycidyl ethers which are derived from 2,2-bis-(p-hydroxyphenyl)-propane (bisphenol A) and which correspond to the average formula wherein z denotes an integral or fractional small number, for example having a value of 0 to 2, may be especially mentioned.

As has already been mentioned initially, the N,N'-diglycidyl compounds derived from heterocyclic nitrogen compounds are distinguished by their particularly good compatibility with the polyamide-dicarboxylic acids. Such preferentially used N,N'- diglycidyl compounds are derived from heterocyclic nitrogen compounds having more than one NH group such as for example ethyleneurea, propyleneurea, parabanic acid and especially hydantoin and hydantoin derivatives such as 5-monoalkyl-hydantoins and 5,5 - dialkyl-hydantoins. N,N'-diglycidyl-ethyleneurea and especially N,N'-diglycidyl-5,5-dimethyl-hydantoin may for example be mentioned, and furthermore, especially, diepoxide compounds based on bis(5,5-dimethylhydantoins) such as for example:

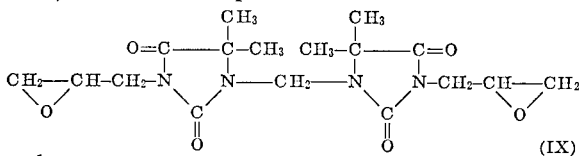

and

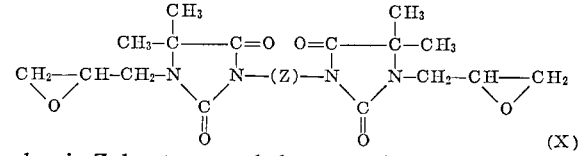

wherein Z denotes a methylene or polymethylene residue which may optionally be interrupted by an ether oxygen bridge.

Particularly suitable compounds are those of Formula IX or X wherein $Z=(CH_2)_n$ and wherein $n=1-12$. Such diepoxide compounds have good compatibility with the polyester-polyamide-dicarboxylic acids. Furthermore the hydrogen bridges of the epoxide compound result in an increase in the strength of the shaped article without disturbing the structural building-up principle.

Mixtures of two or more of the above-mentioned diepoxides can naturally also be used. It has proved advantageous to add an N-containing diepoxide compound such as for example N,N'-diglycidyl-5,5-dimethylhydantoin to a usual aromatic or cycloaliphatic diglycidyl compound or cycloaliphatic diepoxide compound having an epoxide group or groups located on the ring.

As optionally additionally used cross-linking agents it is for example possible to use a triepoxide compound such as triglycidyl isocyanurate or N,N',N"-tri(β-glycidyl-oxypropionyl)-hexahydro-s-triazine or a tricarboxylic acid such as tricarballylic acid.

The N-containing triepoxide compounds such as triglycidyl isocyanurate have proved particularly advantageous since they possess good compatibility with the polyester-polyamide-dicarboxylic acids alongside possessing a low vapour pressure.

Further preferred possible cross-linking agents are dicarboxylic acid anhydrides. There may for example be mentioned phthalic anhydride, Δ⁴-tetrahydrophthalic anhydride, hexahydrophthalic anhydride, 4 - methylhexahydrophthalic anhydride, 3,6 - endomethylene-tetrahydrophthalic anhydride, methyl-3,6-endomethylene-tetrahydrophthalic anhydride (=methylnadic anhydride), 3,4,5,6, 7,7 - hexachlor-3,6-endomethylene-tetrahydrophthalic anhydride, succinic anhydride, adipic anhydride, azelaic anhydride, sebacic anhydride, maleic anhydride, allylsuccinic anhydride, dodecenylsuccinic anhydride, 7-allyl-bicyclo(2,2,1)-hept-5-ene-2,3-dicarboxylic acid anhydride, pyromellitic acid dianhydride or mixtures of such anhydrides.

Amongst the above-mentioned polycarboxylic acid anhydrides, hexahydrophthalic anhydride, $\Delta^4$-tetrahydrophthalic anhydride, 4-methylhexahydrophthalic anhydride, 4-methyltetrahydrophthalic anhydride, methylnadicanhydride and especially polysebacic acid anhydride and dodecenylsuccinic anhydride have particularly proved successful.

The manufacture of elastomeric plastic products according to the invention as a rule takes place with simultaneously shaping to give castings, foamed articles, seals, coatings, laminates, adhesives bonds and the like. Herein the procedure is to manufacture a mixture of the dicarboxylic acid (I) and the diepoxide as well as the optionally conjointly used cross-linking agent (for example dicarboxylic acid anhydride) and then to allow this mixture, after introducing it into moulds, spreading it as coatings, introducing it into adhesives joints and the like, to react fully, with application of heat, to give the elastomeric plastic.

In the manufacture of shaped articles having a relatively larger surface in relation to the mass, such as films, coatings and the like, the conjoint use of an antioxidant such as for example di-(tert.butyl)-p-cresol can be advantageous.

Moulding compositions which can be converted under the influence of heat to shaped articles including two-dimensional structures such as coatings or glue bonds, and which contain a polyester-polyamide-dicarboxylic acid of Formula I and a diepoxide compound as well as optionally also an antioxidant and/or an additional cross-linking agent such as especially a dicarboxylic acid anhydride are therefore also a subject of the present invention.

Herein, 0.6 to 1.2, preferably 0.8 to 1.0 equivalent of carboxyl groups are present per one equivalent of epoxide groups provided no additional cross-linking agent is present. When using a dicarboxylic acid anhydride as a cross-linking agent, the anhydride is as a rule present in an amount of 0.1 to at most 0.7, preferably 0.2 to 0.3, mol per one equivalent of carboxyl groups of the dicarboxylic acid (I) and in this case the mixture should furthermore contain an excess of 0.1 to 0.8, preferably 0.2 to 0.3, epoxide group equivalent of the diepoxide compound over the amount required for the reaction with the dicarboxylic acid.

Depending on the application, the moulding compositions are mixed with additives such as fillers, reinforcing agents, anti-ageing agents (inhibitors) flame-inhibiting substances, dyestuffs or pigments.

Suitable fillers or reinforcing agents are fibrous or pulverulent inorganic as well as organic substances. Quartz powder, hydrated aluminium oxide, mica, aluminium powder, iron powder, iron oxide, ground dolomite, chalk powder, gypsum, slate powder, unburnt kaolin (bolus), burnt kaolin, glass fibres, boron fibres, carbon fibres and asbestos fibres may be mentioned.

The molding compositions can furthermore serve, in the unfilled or filled state, as dipping resins, casting resins, impregnating resins, floor covering compositions, sealing compositions, potting and insulating compositions for electrotechnology, and adhesives as well as for the manufacture of such products.

Particularly suitable applications are furthermore elastic foils and strips. These are distinguished by high extensibility and strength. The strength and elasticity of the foils and strips can be further improved by stretching them beforehand.

In the examples which follow the percentages denote percentages by weight unless otherwise stated.

The polyester-polyamide-dicarboxylic acids A–N described below were used for the manufacture of elastomeric plastics described in the examples:

(A) MANUFACTURE OF THE POLYESTERS

The following acid polyesters I–X served as the starting substances for the maufacture of the polyester-polyamide-dicarboxylic acids described later on under section (B):

MANUFACTURE OF POLYESTER I 584 g. of adipic acid and 315 g. of hexane-1,6-diol (corresponding to a molar ratio of 3:2) were warmed to 150° C. under a nitrogen atmosphere and further warmed to 202° C. over the course of 2 hours whilst stirring, with the water resulting from the polycondensation being distilled off continuously. The last remnants of water were removed by a vacuum treatment for 50 minutes at 205° C. and 9 mm. Hg. The reaction product was white and crystalline and had a melting point of 46° C. The carboxylic acid equivalent weight was 297 (theory=301).

MANUFACTURE OF POLYESTER II 1414 g. of sebaic acid and 662 g. of neopentyl glycol (corresponding to a molar ratio of 11:10) were warmed to 144° C. under a nitrogen atmosphere and further warmed to 214° C. over the course of 6 hours whilst stirring, with the water produced by the polycondensation being distilled off continuously. The last remnants of water were removed by a vacuum treatment lasting 1 hour at 10 mm. Hg. The reaction product was liquid and had a carboxylic acid equivalent weight of 1080 (theory 1450).

MANUFACTURE OF POLYESTER III 1414 g. of sebacic acid and 750 g. of 1,6-hexanediol (corresponding to a molar ratio of 11:10) were warmed to 1350° C. under a nitrogen atmosphere and further warmed to 230° C. over the course of 6 hours whilst stirring, with the water produced by the polycondensation being continuously distilled off. After a further 2 hours at 230° C. the last remnants of water were removed by a vacuum treatment for 2 hours at 20 mm. Hg. The reaction product was white and crystalline and had a melting point of 62° C. The carboxylic acid equivalent weight was 1666. (Theory=1521).

MANUFACTURE OF POLYESTER IV 606 g. of sebacic acid and 208 g. of neopentyl glycol (corresponding to a molar ratio of 3:2) were warmed to 152° C. under nitrogen and further warmed to 212° C. over the course of 2½ hours whilst stirring, with the water produced by the polycondensation being continuously distilled off. The last remnants of water were removed by vacuum treatment lasting 1½ hours at 8 mm. Hg. The reaction product was colourless and liquid at room temperatures. The carboxylic acid equivalent weight was 358 (theory 371).

MANUFACTURE OF POLYESTER V 575 g. of adipic acid and 363 g. of hexanediol-1,6 (corresponding to a molar ratio of 5:4) were warmed to 122° C. under a nitrogen atmosphere and further warmed to 196° C. over the course of 2½ hours whilst stirring, with the water produced by the polycondensation being continuously distilled off. The last remnants of the water were removed by vacuum treatment lasting 0.5 hour at 9 mm. Hg. The reaction product was white and crystalline and had a melting point of 51° C. The carboxylic acid equivalent weight was 456 (theory 529).

MAUNFACTURE OF POLYESTER VI 657 g. of sebacic acid and 597 g. of dodecanediol-1,12 (corresponding to a molar ratio of 11:10) were warmed to 145° C. under a nitrogen atmosphere and warmed to 231° C. over the course of 3 hours whilst stirring, with the water produced by the polycondensation being continuously distilled off. The last remnants of water were removed by a vacuum treatment lasting 2 hours at 15 mm. Hg. The reaction product was white and crystalline and had a melting point of 76° C. The carboxylic acid equivalent weight was 1500, theory 1946).

MAUNFACTURE OF POLYESTER VII 1606 g. (11 mols) of adipic acid and 1050 g. (10 mols+1% excess) of neopentyl glycol were mixed with 1.5 g. of p-toluenesulphonic acid and 1000 ml. of toluene and heated to reflux in a water separator, whilst stirring. After 48 hours the separation was ended with 359 g. (theory 360 g.) of water. The toluene was now evaporated off and the reaction mixture finally brought to constant weight under 0.5 mm. Hg. at 90° C. bath temperature. Hereupon 2165 g. of a light yellow viscous oil were obtained having an acid equivalent weight to 1003 (theoretical value: 1143).

MANUFACTURE OF POLYESTER VIII 575 g. of adipic acid and 363 g. of hexanediol-1,6 (corresponding to a molar ratio of 5:4) were warmed to 140° C. under a nitrogen atmosphere and further warmed to 218° C. over the course of 5 hours whilst stirring, with the water produced by the polycondensation being continuously distilled off. The last remnants of water were removed by a vacuum treatment lasting 1 hour at 64 mm. Hg and 1½ hours at 20 mm. Hg. The reaction product was white and crystalline and had a melting point of 51° C. The carboxylic acid equivalent weight was 531 (theory 529).

(A.1) MANUFACTURE OF POLYESTER IX 118 g. (1 mol) of hexane-1,6-diol and 404 g. (2 mols) of sebacic acid were heated under nitrogen for 4 hours to 170° C. and 2½ hours under 25–30 mm. Hg at the same temperature, and the water formed was continuously distilled off. A crystalline diester-dicarboxylic acid having an acid equivalent weight of 247.5 (theory 243.3) and a melting range of 81–89° C. was thereby obtained.

(2) MANUFACTURE OF POLYESTER X 93.1 g. (1.5 mols) of ethylene glycol and 438.4 g. (3 mols) of adipic acid were heated over the course of 3 hours under $N_2$ from 150° C. to 180° C. and kept for 4 hours at 180° C. At the same time the water formed was continuously distilled off, and a crystalline product having an acid equivaent weight of 159 (theory 159) was obtained. Melting range: 93–101° C.

(B) MANUFACTURE OF THE POLYESTER-POLYAMIDE-DICARBOXYLIC ACIDS

The polyester-polyamide-dicarboxylic acids which are employed in the examples which follow are all manufactured according to the same process so that they can be summarised in the following Table I.

The polyesters I–VIII manufactured according to known processes and described above under section (A) are mixed with an amount of lactam corresponding to a desired content of amide groups/kg. and a small quantity of water (0.2 g.) as the catalyst and heated to 210°–220° C. in an autoclave for between 6 and 12 hours. After completion of the reaction the product is examined for constituents which can still be distilled off or sublimed off respectively, these frequently lying between 3 and 5% and consisting partially of unreacted lactam and partially of split off glycol liberated by amidation reactions. Depending on the structure of the ester and the amide content the products represent waxy to hard grey, olive or brown coloured melts which have partially solidified to crystals. The yields are quantitative. The products are employed in the crude state. The amide content can be calculated from the nitrogen analyses. No free amino groups can be detected in the products. The frequently less than calculated rise in the acid equivalent weight between the acid polyester and the polyester-polyamide-dicarboxylic acids also originates from amidation reactions of the polyester with the lactam employed. An increase in the alcohol group content can at the same time be detected. This is the more pronounced, the greater the amount of lactam employed.

TABLE I

| | Starting substances [1] | | | | Reaction conditions | | | End product | | |
|---|---|---|---|---|---|---|---|---|---|---|
| | Polyester-containing carboxyl groups | | Lactam | | | | | | | |
| Product description (polyester-polyamide-dicarboxylic acid) | Ref. | Acid equivalent weight | Amount of charge, g. | Ref. | Amount of charge, g. | Time, hours | Temp., °C. | Measured pressure, atmospheres | Acid equivalent weight | Nitrogen content, percent | Corresponding amide group content per kg. |
| A | I | 297 | 330.0 | Caprolactam | 377.0 | 12 | 210 | 0 | 243 | 6.11 | 4.36 |
| B | II | 1,080 | 432.0 | do | 271.0 | 6 | 220 | 0 | 1,450 | 4.49 | 3.21 |
| C | III | 1,666 | 464.5 | do | 135.5 | 12 | 220 | 2 | 1,788 | 2.80 | 2.00 |
| D | III | 1,666 | 410.0 | do | 190.0 | 12 | 220 | 0 | 2,027 | 3.91 | 2.79 |
| E | III | 1,666 | 432.0 | do | 271.0 | 6 | 220 | 2 | 1,743 | 4.27 | 3.05 |
| F | III | 1,666 | 360.0 | do | 270.0 | 8 | 200 | 1 | 2,350 | | 3.8 |
| G | III | 1,666 | 308.0 | do | 292.0 | 17 | 220 | 2 | 2,225 | 5.88 | 4.20 |
| H | III | 1,666 | 261.0 | do | 339.0 | 17 | 220 | 2 | 2,405 | 6.77 | 4.84 |
| J | IV | 358 | 320.0 | do | 240.0 | 8 | 220 | 0 | 605 | 5.18 | 3.70 |
| K | V | 456 | 432.0 | do | 271.0 | 6 | 220 | 2 | 700 | 4.65 | 3.32 |
| L | VI | 1,500 | 375.0 | do | 226.0 | 10 | 220 | 0 | 2,177 | 4.51 | 3.22 |
| M | VII | 1,003 | 342.0 | do | 258.0 | 12 | 220 | 2 | 1,538 | 5.10 | 3.64 |
| N | VIII | 531 | 524.0 | do | 226.0 | 10 | 220 | 2 | 725 | 3.73 | 2.66 |
| O | IX | 247.5 | 247.5 | | 452.0 | 10 | 220 | 0 | 669 | 8.70 | 6.2 |
| P | X | 159.0 | 159.0 | | 452.0 | 12 | 220 | 0 | 554 | 9.72 | 6.9 |

[1] Catalyst for all charges: 0.2 g. of $H_2O$.

EXAMPLE 1

MANUFACTURE OF ELASTOMERIC SHAPED ARTICLES.—(a) 54.3 g. of the polyester-polyamide-dicarboxylic acid A together with 53.2 g. of dodecenylsuccinic anhydride were warmed to 150° C. and left for 15 minutes at this temperature. Thereafter the mixture was warmed to 180° C. and 28.5 g. of an N,N-diglycidyl compound of the following constitution

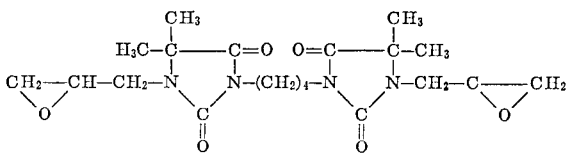

Epoxide Resin I having an epoxide content of 4.67 epoxide equivalents/kg. were added (=epoxide resin I). This corresponds to a ratio of 1.3 equivalents of epoxide and 0.2 equivalent of anhydride per 1.0 equivalent of dicarboxylic acid. After good stirring the mixture was cast into aluminium moulds pre-warmed to 190° C. (internal dimensions 13.5 x 13.5 x 0.1 cm.). After a heat treatment of 2 hours at 200° C. the material was removed from the mould and test specimen corresponding to ISO Draft Recommendation 468 (test specimens No. 1) were punched out by means of a punch tool. The following properties were measured:

Tensile strength according to ISO 468=48 kp./cm.²
Elongation at break according to ISO 468=500%.

(b) When using 380 g. of polyester-polyamide-dicarboxylic acid A (=0.7 equivalent) and 133 g. of dodecenylsuccinic anhydride with the same quantity of epoxide resin I and the same processing as 1a, the following results were obtained:

Tensile strength according to ISO 468=90 kg./cm.²
Elongation at break according to ISO 468=350%.

EXAMPLE 2

(a) 101.2 g. of polyester-polyamide-dicarboxylic acid B together with 5.52 g. of polysebacic acid anhydride were warmed to 180° C., thoroughly mixed and kept for 5 minutes at this temperature. Thereafter 25.2 g. of epoxide resin I corresponding to Example 1 were added and well mixed. This corresponds to 0.7 equivalent of dicarboxylic acid and 0.3 equivalent of anhydride per 1.15 equivalents of epoxide. The mixture was cast into the pre-warmed moulds according to Example 1. After a heat treatment of 4 hours at 180° C. the following properties were measured on the punched-out 1 mm. thick test specimen:

Tensile strength according to ISO 468=28 kp./cm.²
Elongation at break according to ISO 468=1600%

(b) When using 4.6 g. (corresponding to 0.3 equivalent) of hexahydrophthalic anhydride and otherwise the same composition and processing as in Example 2a, the following values were measured:

Tensile strength according to ISO 468=28 kp./cm.²
Elongation at break according to ISO 468=1680%.

EXAMPLE 3

125 g. of polyester-polyamide-dicarboxylic acid C were warmed to 190° C. and mixed with 8.0 g. of dodecenylsuccinic anhydride. The mixture was kept for 5 minutes at 190° C. and subsequently 23.0 g. of N-diglycidyl compounds of formula

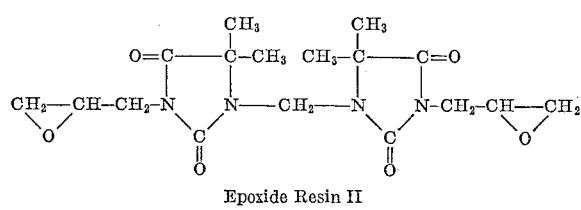

Epoxide Resin II were added. This corresponds to a ratio of 0.7 equivalent of dicarboxylic acid and 0.3 equivalent of anhydride per 1.15 equivalents of epoxide. The mixture was cast into the pre-warmed moulds in accordance with Example 1. After a heat treatment of 4 hours at 190° C. the following properties were measured on the punched-out 1 mm. thick test specimen:

Tensile strength according to ISO 468=80 kp./cm.²
Elongation at break according to ISO 468=650%.

EXAMPLE 4

(a) 178.8 g. of polyester-polyamide-dicarboxylic acid C were warmed to 190° C. and well mixed with 20.4 g. of a bisphenol A diglycidyl ether manufactured by condensation of epichlorohydrin with 2,2-bis-(p-hydroxyphenyl)-propane (=bisphenol A) in the presence of alkali, which was liquid at room temperature and had an epoxide content of 5.35 epoxide equivalents per kg. (=epoxide resin III). This corresponds to 1.1 equivalent of epoxide per 1.0 equivalent of dicarboxylic acid. The mixture was partly cast into the pre-warmed moulds according to Example 1 and partly in aluminum moulds for test specimens according to DIN 16946 and DIN 53455 respectively (4 mm. thick). After a heat treatment of 4 hours at 190° C. the following properties were measured on the punched-out 1 mm. thick test specimens:

Tensile strength according to ISO 468=82 kp./cm.²
Elongation at break according to ISO 468=770%.
Tensile strength according to DIN 53455=160 kp./cm.²
Elongation at break according to DIN 53455=700%.

4 mm. thick test specimens according to DIN 53455 were subjected to a load of 30 kg. and the load again removed. The stretched test specimens behaved elastically up to very high tensions, that is to say they showed no, or only slight permanent elongation after removal of the load. The following tension-deformation behaviour was measured.

Cross-section of the stretched test specimen=8.46 mm.²

| Load, kg. | Elongation on— | |
|---|---|---|
| | Loading, mm. | Removal of load, mm. |
| 0 | 100 | 100 |
| 1 | 102.5 | 105 |
| 2 | 105.5 | 109 |
| 3 | 109.5 | 113 |
| 4 | 113.5 | |
| 0 | 100 | 100 |
| 2 | 108 | 120 |
| 4 | 116 | 130 |
| 6 | 124 | 136 |
| 8 | 131 | 140 |
| 10 | 136 | 142 |
| 12 | 141 | 144 |
| 14 | 144 | 146.5 |
| 16 | 147 | |
| 0 | 100 | 106 |
| 4 | 115 | 133 |
| 8 | 129 | 143 |
| 12 | 140 | 147 |
| 16 | 146 | 154.5 |
| 20 | 150 | 156 |
| 24 | 153 | 156.5 |
| 28 | 155.5 | 157 |
| 32 | 158 | |

Tensile strength=650 kp./cm.².
Elongation at break=70%.

EXAMPLE 5

141.8 g. of polyester-polyamide-dicarboxylic acid D were warmed to 190° C. and well mixed with 8.0 g. of dodecenylsuccinic anhydride. The mixture was kept at 190° C. for 5 minutes and subsequently mixed with 21.3 g. of epoxide resin III according to Example 4. This corresponds to 0.7 equivalent of dicarboxylic acid and 0.3 equivalent of anhydride per 1.15 equivalents of epoxide. The mixture was cast into the pre-warmed moulds according to Example 1. After a heat treatment of 4 hours at 190° C. the following properties were measured on the punched-out 1 mm. thick test specimens:

Tensile strength according to ISO 468=76 kp./cm.²
Elongation at break according to ISO 468=900%.

EXAMPLE 6

202.7 g. of polyether-polyamide-dicarboxylic acid D were warmed with 20.2 g. of epoxide resin II according to Example 2a to 190° C. and well mixed. This corresponds to a ratio of 1.0 equivalent of dicarboxylic acid to 1.1 equivalents of epoxide. The mixture was cast into the pre-warmed moulds according to Example 1. After a heat treatment of 4 hours at 190° C. the following properties were measured on the punched-out 1 mm. thick test specimens:

Tensile strength according to ISO 468=91 kp./cm.²
Elongation at break according to ISO 468=780%.

EXAMPLE 7

(a) 80.8 g. of polyester-polyamide-dicarboxylic acid E were warmed with 8.0 g. of dodecenylsuccinic anhydride to 180° C., well mixed and kept at this temperature for 5 minutes. Thereafter 25.2 g. of epoxide resin I according to Example 1 were added and well mixed. This corresponds to 0.7 equivalent of dicarboxylic acid and 0.3 equivalent of anhydride per 1.15 equivalents of epoxide. The mixture was cast into the pre-warmed moulds according to Example 1. After a heat treatment of 4 hours at 190° C. the following properties were measured on the punched-out 1 mm. thick test specimens:

Tensile strength according to ISO 468=63 kp./cm.$^2$
Elongation at break according to ISO 468=770%.

(b) On adding 0.25 g. of 2-ethyl-4-methyl-imidazole, with the composition and processing otherwise being the same as in Example 7a, the following results were measured:

Tensile strength according to ISO 468=80 kp./cm.$^2$
Elongation at break according to ISO 468=630%.

EXAMPLE 8

(a) 115.3 g. of polyester-polyamide-dicarboxylic acid E were warmed to 180° C. with 10.6 g. of dodecenylsuccinic anhydride, well mixed and kept at this temperature for 5 minutes. Thereafter 17.2 g. of $\Delta^4$-tetrahydrophthalic acid diglycidyl ester having an epoxide content of 6.4 epoxide equivalents/kg. (=epoxide resin IV) were added and well mixed. This corresponds to 1.0 equivalent of dicarboxylic acid and 0.4 equivalent of anhydride per 1.1 equivalents of epoxide. The mixture was cast into the pre-warmed moulds according to Example 1. After a heat treatment of 3 hours at 190° C. the following properties were measured on the punched-out 1 mm. thick test specimens:

Tensile strength according to ISO 468=98 kp./cm.$^2$
Elongation at break according to ISO 468=700%.

(b) On using 22.7 g. of epoxide resin II corresponding to Example 3 instead of epoxide resin IV and otherwise the same composition and processing as in Example 8a, the following results were obtained:

Tensile strength according to ISO 468=67.8 kp./cm.$^2$
Elongation at break according to ISO 468=620%.

EXAMPLE 9

115.3 g. of polyester-polyamide-dicarboxylic acid E were warmed at 180° C. with 10.6 g. of dodecenylsuccinic anhydride, well mixed and kept at this temperature for 5 minutes. Thereafter 27.8 g. of epoxide resin III according to Example 4 were added and well mixed. This corresponds to 1.0 equivalent of dicarboxylic acid and 0.4 equivalent of anhydride per 1.5 equivalents of epoxide. The mixture was cast into the pre-warmed moulds according to Example 1. After a heat treatment of 3 hours at 190° C. the following properties were measured on the punched-out 1 mm. thick test specimens:

Tensile strength according to ISO 468=85 kp./cm.$^2$
Elongation at break according to ISO 468=700%.

EXAMPLE 10

(a) 165 g. of polyester-polyamide-dicarboxylic acid F were warmed to 180° C. with 8.0 g. of dodecenylsuccinic anhydride, well mixed and kept at this temperature for 5 minutes. Thereafter 25.9 g. of epoxide resin III according to Example 4 were added and well mixed. This corresponds to 0.7 equivalent of dicarboxylic acid and 0.3 equivalent of epoxide. The mixture was cast into the pre-warmed moulds according to Example 1. After this heat treatment of 4 hours at 190° C. the following properties were measured on the punched-out 1 mm. thick test specimens:

Tensile strength according to ISO 468=95 kp./cm.$^2$
Elongation at break according to ISO 468=720%.

The moulding material showed crystal transition ranges at 43° C. and 107° C. (determined by differential thermal analysis by means of the Perkin Elmer differential scanning colorimeter DSC 1).

(b) On using 18.0 g. of epoxide resin IV according to Example 8 instead of the epoxide resin III employed, and otherwise the same composition and processing as in Example 10a, the following properties were measured:

Tensile strength according to ISO 468=95 kp./cm.$^2$
Elongation at break according to ISO 468=870%.

(c) When using 25.2 g. of epoxide resin I according to Example 1 instead of epoxide resin III and otherwise the same composition and processing as in Example 10a, the following results were measured:

Tensile strength according to ISO 468=156 kp./cm.$^2$
Elongation at break according to ISO 468=700%.

The shaped article showed crystal transition ranges at 44° C. and 104° C.

EXAMPLE 11

14.8 g. of epoxide resin III according to Example 4 were warmed to 180° C. with 3.05 g. of triglycidyl isocyanurate having an epoxide content of 9.84 epoxide equivalents/kg. (=epoxide resin V) and 222.4 g. of polyester-polyamide-dicarboxylic acid G and well mixed. This corresponds to a ratio of 0.8 equivalent of epoxide resin III and 0.3 equivalent of epoxide resin V per 1.0 equivalent of dicarboxylic acid. The mixture was cast into the pre-warmed moulds according to Example 1. After a heat treatment of 4 hours at 190° C. the following properties were measured on the punched-out 1 mm. thick test specimens:

Tensile strength according to ISO 468=110 kp./cm.$^2$
Elongation at break according to ISO 468=400%.

EXAMPLE 12

(a) 232 g. of polyester-polyamide-dicarboxylic acid F were warmed to 190° C. with 24.1 g. of epoxide resin I according to Example 1 and well mixed. This corresponds to 1.0 equivalent of dicarboxylic acid per 1.1 equivalents of epoxide compound. The mixture was cast into the pre-warmed moulds according to Example 1. After a heat treatment of 4 hours at 190° C. the following properties were measured on the punched-out 1 mm. thick test specimens:

Tensile strength according to ISO 468=92 kp./cm.$^2$
Elongation at break according to ISO 468=630%.

(b) On using 22.0 g. of epoxide resin II according to Example 3 instead of epoxide resin I and otherwise the same composition and processing as in Example 2a, the following results were measured:

Tensile strength according to ISO 468=117 kp./cm.$^2$
Elongation at break according to ISO 468=720%.

(c) On using 14.5 g. of N,N'-diglycidyl compound of the following constitution:

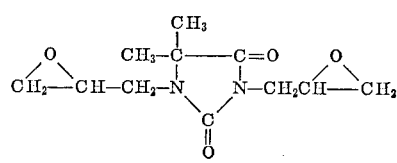

having an epoxide content of 7.6 epoxide equivalents/kg. (=epoxide resin VI) and otherwise the same composition and processing as in Example 11a the following values were obtained:

Tensile strength according to ISO 468=63 kp./cm.²
Elongation at break according to ISO 468=330%.

EXAMPLE 13

(a) 156 g. of polyester-polyamide-dicarboxylic acid G were warmed to 180° C. with 8.0 g. of dodecenylsuccinic anhydride, well mixed and kept at this temperature for 5 minutes. Thereafter 25.2 g. of epoxide resin I according to Example 1 were added and well mixed. This corresponds to 0.7 equivalent of dicarboxylic acid and 0.3 equivalent of anhydride per 1.15 equivalents of epoxide compound. The mixture was cast into the pre-warmed moulds according to Example 1. After a heat treatment of 4 hours at 190° C. the following properties were measured on the punched-out 1 mm. thick test specimens:

Tensile strength according to ISO 468=125 kp./cm.²
Elongation at break according to ISO 468=500%.

(b) On using 22.1 g. of epoxide resin II according to Example 3 instead of epoxide resin I and otherwise the same composition and processing as in Example 12a, the following properties were measured:

Tensile strength according to ISO 468=125 kp./cm.²
Elongation at break according to ISO 468=420%.

(c) On using 5.34 g. of methylnadicanhydride instead of dodecenylsuccinic anhydride and otherwise the same composition and processing as in Example 13b, the following properties were measured:

Tensile strength according to ISO 468=110 kp./cm.²
Elongation at break according to ISO 468=580%.

(d) On using a mixture of 10.6 g. of epoxide resin II according to Example 3 and 11.1 g. of epoxide resin III according to Example 4 instead of epoxide resin I and otherwise the same composition and processing as in Example 13a, the following results were obtained:

Tensile strength according to ISO 468=155 kp./cm.²
Elongation at break according to ISO 468=440%.

The shaped article showed crystal transition ranges at 45° C. and 116° C., both in the stretched and also in the unstretched state.

(e) On using 4.62 g. of hexahydrophthalic anhydride instead of dodecenylsuccinic anhydride and otherwise the same composition and processing as in Example 13b, the following results were obtained:

Tensile strength according to ISO 468=101 kp./cm.²
Elongation at break according to ISO 468=390%.

(f) On using 31.3 g. of an N,N'-diglycidyl compound of the following constitution:

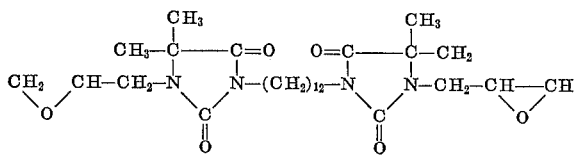

having an epoxide content of 3.68 epoxide equivalents/kg. (=epoxide resin VII) and otherwise the same composition and processing as in Example 13a, the following properties were measured:

Tensile strength according to ISO 468=109 kp./cm.²
Elongation at break according to ISO 468=560%.

EXAMPLE 14

148.5 g. of polyester-polyamide-dicarboxylic acid H were warmed to 180° C. with 8.0 g. of dodecenylsuccinic anhydride, well mixed and kept at this temperature for 5 minutes. Thereafter 22.1 g. of epoxide resin II according to Example 3 were added and well mixed. This corresponds to 0.7 equivalent of dicarboxylic acid and 0.3 equivalent of anhydride per 1.15 equivalents of epoxide compound. The mixture was cast into the pre-warmed moulds according to Example 1. After a heat treatment of 4 hours at 190° C. the following properties were measured on the punched-out 1 mm. thick test specimens.

Tensile strength according to ISO 468=163 kp./cm.²
Elongation at break according to ISO=376%.

EXAMPLE 15

(a) 42.4 g. of polyester-polyamide-dicarboxylic acid I were well mixed with 8.0 g. of dodecenylsuccinic anhydride at 180° C. and kept at this temperature for 5 minutes. Thereafter 25.2 g. of epoxide resin III according to Example 4 were added and well mixed. This corresponds to 0.7 equivalent of dicarboxylic acid and 0.3 equivalent of anhydride per 1.15 equivalents of epoxide compounds. The mixture was cast into the pre-warmed moulds according to Example 1. After a heat treatment of 4 hours at 190° C. the following properties were measured on the punched-out 1 mm. thick test specimen:

Tensile strength according to ISO 468=17 kp./cm.²
Elongation at break accocrding to ISO 468=520%.

Permanent deformation after an elongation of $$500\% = 3\%$$

(b) On using 23.0 g. of epoxide resin II according to Example 3 instead of epoxide resin III and otherwise the same composition and processing as in Example 15a, the following values were obtained:

Tensile strength according to ISO 468=25 kp./cm.²
Elongation at break according to ISO 468=500%.
Permanent deformation after an elongation of $$500\% = 3\%$$

EXAMPLE 16

(a) 49.5 g. of polyester-polyamide-dicarboxylic acid K were warmed to 180° C. with 8.0 g. of dodecenylsuccinic anhydride, well mixed and kept at this temperature for 5 minutes. Thereafter 21.3 g. of epoxide resin III according to Example 4 were added and well mixed. This corresponds to 0.7 equivalent of dicarboxylic acids and 0.3 equivalent of anhydride per 1.15 equivalents of epoxide compound. The mixture was cast into the pre-warmed moulds according to Example 1. After a heat treatment of 4 hours at 190° C. the following properties were measured on the punched-out 1 mm. thick test specimens:

Tensile strength according to ISO 468=12 kp./cm.²
Elongation at break according to ISO 468=880%.
Permanent deformation after an elongation of $$800\% = 67\%$$

(b) On using 0.6 equivalent of dicarboxylic acid and 0.4 equivalent of anhydride and otherwise the same composition and processing as in Example 16a, the following results were obtained:

Tensile strength according to ISO 468=13 kp./cm.²
Elongation at break according to ISO 468=490%.
Permanent deformation after an elongation of $$490\% = 0\%$$

EXAMPLE 17

152.2 g. of polyester-polyamide-dicarboxylic acid L were warmed to 180° C. with 8.0 g. of dodecenylsuccinic anhydride, well mixed and kept for 5 minutes at this temperature. Thereafter 25.2 g. of epoxide resin I according to Example 1 were added and well mixed. This corresponds to 0.7 equivalent of dicarboxylic acid and 0.3 equivalent of anhydride per 1.15 equivalents of epoxide compound. The mixture was cast into a pre-warmed mould according to Example 1. After a heat treatment of 4 hours at 190° C. the following properties were measured on the punched-out 1 mm. thick test specimens:

Tensile strength according to ISO 468=105 kp./cm.²
Elongation at break according to ISO 468=550%.
Permanent deformation after an elongation of

500%=300%

EXAMPLE 18

46.1 g. of polyester-polyamide-dicarboxylic acid M were warmed to 180° C. with 18.6 g. of dodecenylsuccinic anhydride, well mixed and kept for 5 minutes at this temperature. Thereafter 22.1 g. of epoxide resin II according to Example 3 were added and well mixed. This corresponds to 0.7 equivalent of dicarboxylic acid and 0.3 equivalent of anhydride per 1.15 equivalents of epoxide compound. The mixture was cast into the pre-warmed moulds according to Example 1. After a heat treatment of 4 hours at 190° C. the following properties were measured on the punched-out 1 mm. thick test specimens:

Tensile strength according to ISO 468=173 kp./cm.²
Elongation at break according to ISO 468=250%.

The shaped articles behave in a visco-elastic manner and after an elongation of 200% have a permanent deformation of 5%.

EXAMPLE 19

(a) 50.8 g. of polyester-polyamide-dicarboxylic acid N were warmed to 180° C. with 8.0 g. of dodecenylsuccinic anhydride, well mixed and kept for 5 minutes at this temperature. Thereafter 23.0 g. of epoxide resin II according to Example 3 were added and well mixed. This corresponds to 0.7 equivalent of dicarboxylic acid and 0.3 equivalent of anhydride per 1.15 equivalents of epoxide compound. The mixture was cast into the pre-warmed moulds according to Example 1. After a heat treatment of 4 hours at 190° C. the following properties were measured on the punched-out 1 mm. thick test specimen:

Tensile strength according to ISO 468=16 kp./cm.²
Elongation at break according to ISO 468=480%.
Permanent deformation after an elongation of

400%=0%

(b) On using a mixture of 16.7 g. of epoxide resin III according to Example 4 and 3.3 g. of epoxide resin V according to Example 11, corresponding to 0.9 equivalent of epoxide resin III and 0.25 equivalent of epoxide resin V, and otherwise the same composition and processing as in Example 19a, the following properties were measured:

Tensile strength according to ISO 468=11 kp./cm.²
Elongation at break according to ISO 468=720%.
Permanent deformation after 700% elongation=0%.

(c) On using 31.3 g. of epoxide resin VII according to Example 13 and otherwise the same composition and processing as in Example 19a, the following properties were measured:

Tensile strength according to ISO 468=25 kp./cm.²
Elongation at break according to ISO 468=540%.
Permanent deformation after 500% elongation=0%.

EXAMPLE 20

669 g. of polyester-polyamide-dicarboxylic acid O (=1.0 equivalent) were warmed to 180° C. and well mixed with 204 g. of epoxide resin III (=1.1 equivalents) at this temperature. The mixture was cast into the pre-warmed moulds according to Example 1. After a heat treatment lasting 3 hours at 180° C. the following properties were measured on the punched-out 1 mm. thick test specimens:

Tensile strength according to ISO 468=170 kp./cm.²
Elongation at break according to ISO 468=320%.
Crystallisation transition temperature=34° C.

EXAMPLE 21

554 g. of polyester-polyamide-dicarboxylic acid P (=1.0 equivalent) were warmed to 180° C. and well mixed with 185 g. of epoxide resin III (=1.0 equivalent) at this temperature. The mixture was cast into the pre-warmed moulds according to Example 1. After a heat treatment lasting 3 hours at 180° C. the following properties were measured on the punched-out 1 mm. thick test specimen:

Tensile strength according to ISO 468=94 kp./cm.²
Elongation at break according to ISO 468=340%.

What is claimed is:

1. A curable composition of matter comprising (a) long-chain polyester-polyamide-dicarboxylic acid of formula

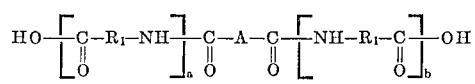

wherein $R_1$ represents a branched or unbranched alkylene radical having 2 to 11 carbon atoms in the linear chain, and $a$ and $b$ denote zero or an integer, with the sum $(a+b)$ being at least 1 and at most 8, and wherein A denotes a polyester residue having a branched or unbranched hydrocarbon chain interrupted by at least two carboxylic acid ester groups

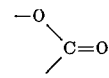

with the proviso that in the structural unit of the polyester radical A, the number of carbon atoms in hydrocarbon radicals divided by the number of oxygen bridges must be 3 to 32, with the further proviso that the total number of carbon atoms present in hydrocarbon radicals in the radical A must be at least 10, and with the further proviso that at least 1.0 and at most 7.0 equivalents of amido groups per kg. must be present in the polyester-polyamide-dicarboxylic acid (a); and (b) diepoxide; and in said composition 0.6 to 1.2 equivalents carboxyl groups of component (a) are present per 1 equivalent epoxide groups of components (b).

2. A curable composition of matter comprising (a) long-chain polyester-polyamide-dicarboxylic acid of formula

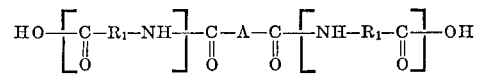

wherein $R_1$ represents a branched or unbranched alkylene radical having 2 to 11 carbon atoms in the linear chain, and $a$ and $b$ denote zero or an integer, with the sum $(a+b)$ being at least 1 and at most 8, and wherein A denotes a polyester residue having a branched or unbranched hydrocarbon chain interrupted by at least two carboxylic acid ester groups

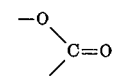

with the proviso that in the structural unit of the polyester radical A, the number of carbon atoms in hydrocarbon radicals divided by the number of oxygen bridges must be 3 to 32, with the further proviso that the total number of carbon atoms present in hydrocarbon radicals in the radical A must be at least 10, and with the further proviso that at least 1.0 and at most 7.0 equivalents of amido groups per kg. must be present in the polyester-polyamide-dicarboxylic acid (a); and (b) diepoxide; and in said composition 0.8 to 1.0 equivalent carboxyl groups of component (a) are present per 1 equivalent epoxide groups of components (b).

3. A curable composition of matter comprising (a) long-chain polyester-polyamide-dicarboxylic acid of formula

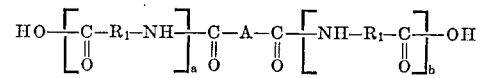

wherein $R_1$ represents the pentamethylene group, and $a$ and $b$ denote zero or an integer, with the sum $(a+b)$ being at least 1 and at most 8, and wherein A denotes a polyester residue having a branched or unbranched hydrocarbon chain interrupted by at least two carboxylic acid ester groups

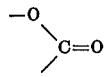

with the proviso that in the structural unit of the polyester radical A, the number of carbon atoms in hydrocarbon radicals divided by the number of oxygen bridges must be 3 to 32, with the further proviso that the total number of carbon atoms present in hydrocarbon radicals in the radical A must be at least 10, and with the further proviso that at least 1.0 and at most 7.0 equivalents of amido groups per kg. must be present in the polyester-polyamide-dicarboxylic acid (a); and (b) diepoxide; and in said composition 0.6 to 1.2 equivalents carboxyl groups of component (a) are present per 1 equivalent epoxide groups of components (b).

4. A curable composition of matter comprising (a) long-chain polyester-polyamide-dicarboxylic acid of formula

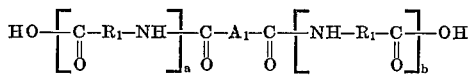

wherein $R_1$ represents a branched or unbranched alkylene radical having 2 to 11 carbon atoms in the linear chain, and $a$ and $b$ denote zero or an integer, with the sum $(a+b)$ being at least 1 and at most 8, and wherein $A_1$ denotes a polyester residue in which members of the group consisting of branched alkylene, unbranched alkylene, branched alkylene and unbranched alkylene chains alternate with carboxylic acid ester groups

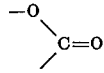

with the proviso that the quotient Z/Q, wherein Z is the number of carbon atoms present in hydrocarbon radicals in the recurring structural unit of the radical $A_1$ and Q is the number of oxygen bridges present in the recurring structural unit of the radical $A_1$ must be 3 to 32, with the further proviso that the total number of carbon atoms present in alternating hydrocarbon radicals in the radical $A_1$ must be at least 25 and with the further proviso that at least 1.0 and at most 6.0 equivalents of amide groups per kg. must be present in the polyester-polyamide-dicarboxylic acid (a); and (b) diepoxide; and in said composition 0.6 to 1.2 equivalents carboxyl groups of component (a) are present per 1 equivalent epoxide groups of component (b).

5. A curable composition of matter which comprises (a) long-chain polyester-polyamide-dicarboxylic acid of formula

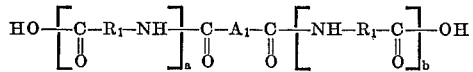

wherein $R_1$ represents a branched or unbranched alkylene radical having 2 to 11 carbon atoms in the linear chain, and $a$ and $b$ denote zero or an integer, with the sum $(a+b)$ being at least 1 and at most 8, and wherein $A_1$ denotes a polyester residue in which members of the group consisting of branched alkylene, unbranched alkylene, branched alkylene and unbranched alkylene chains alternate with carboxylic acid ester groups

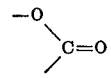

with the proviso that the quotient Z/Q, wherein Z is the number of carbon atoms present in hydrocarbon radicals in the recurring structural unit of the radical $A_1$ and Q is the number of oxygen bridges present in the recurring structural unit of the radical $A_1$ must be 5 to 12, with the further proviso that the total number of carbon atoms present in alternating hydrocarbon radicals in the radical $A_1$ must be at least 40, and with the further proviso that at least 1.0 and at most 6.0 equivalents of amide groups per kg. must be present in the polyester-polyamide-dicarboxylic acid (a); and (b) diepoxide; and in said composition 0.8 to 1.0 equivalent carboxyl groups of component (a) are present per 1 equivalent epoxide groups of component (b).

6. A curable composition of matter which comprises (a) long-chain polyester-polyamide-dicarboxylic acids of formula

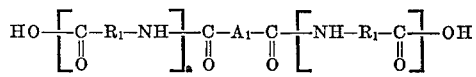

wherein $R_1$ represents the pentamethylene group, and $a$ and $b$ denote zero or an integer, with the sum $(a+b)$ being at least 1 and at most 8, and wherein $A_1$ denotes a polyester residue in which members of the group consisting of branched alkylene, unbranched alkylene, branched alkylene and unbranched alkylene chains alternate with carboxylic acid ester groups

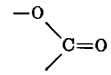

with the proviso that the quotient Z/Q, wherein Z is the number of carbon atoms present in hydrocarbon radicals in the recurring structural unit of the radical $A_1$ and Q is the number of oxygen bridges present in the recurring structural unit of the radical $A_1$ must be 3 to 32, with the further proviso that the total number of carbon atoms present in alternating hydrocarbon radicals in the radical $A_1$ must be at least 25 and with the further proviso that at least 1.0 and at most 6.0 equivalents of amide groups per kg. must be present in the polyester-polyamide-dicarboxylic acid (a); and (b) diepoxide; and in said composition 0.6 to 1.2 equivalents carboxyl groups of component (a) are present per 1 equivalent epoxide groups of component (b).

7. A composition according to claim 1 which contains a diepoxide (b) having an epoxide equivalent weight of not more than 500.

8. A composition according to claim 7 which contains a diepoxide (b) having an epoxide equivalent weight of 100 to 250.

9. A composition according to claim 1 which contains N,N'-diglycidyl derivative of heterocyclic nitrogen compound having more than 1 endocyclic NH-group as the diepoxide (b).

10. A composition according to claim 1 which contains as diepoxide (b) a diglycidyl ether or diglycidyl ester of formula

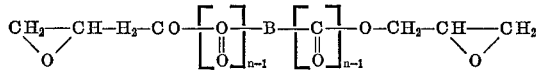

wherein B denotes a bivalent aliphatic, cycloaliphatic, araliphatic or aromatic hydrocarbon radical and $n$ denotes the number 1 or 2.

11. A composition according to claim 1 which in addition contains a dicarboxylic acid anhydride as a crosslinking agent, with 0.1 to 0.7 mol of the dicarboxylic acid anhydride being present per 1 equivalent of carboxyl groups of the polyamide-dicarboxylic acid (a), as well as with an excess of 0.1 to 0.8 epoxide group equivalent of the diepoxide (b) being present above the amount prescribed for the reaction with the polyamide-dicarboxylic acid (a).

12. A composition according to claim 11 which in addition contains a dicarboxylic acid anhydride as a crosslinking agent, with 0.2 to 0.3 mol of the dicarboxylic acid anhydride being present per 1 equivalent of carboxyl groups of the polyamide-dicarboxylic acid (a), as well as with an excess of 0.2 to 0.3 epoxide group equivalent of the diepoxide (b) being present above the amount prescribed for the reaction with the polyamide-dicarboxylic acid (a).

13. A composition according to claim 1 which in addition contains a triepoxide compound as a cross-linking agent, with 0.1 to 0.5 equivalent of epoxide groups of the triepoxide compound being present per 1 equivalent of epoxide groups of the diepoxide (b), and with the composition furthermore containing 0.6 to 1.2 equivalents of carboxyl groups of the polyamide-dicarboxylic acid (a) per 1 equivalent of epoxide group of the mixture of diepoxide (b) and triepoxide compound.

14. A composition according to claim 13 which in addition contains a triepoxide compound as a cross-linking agent, with 0.1 to 0.3 equivalent of epoxide groups of the triepoxide compound being present per 1 equivalent of epoxide groups of the diepoxide (b), and with the composition furthermore containing 0.6 to 1.2 equivalents of carboxyl groups of the polyamide-dicarboxylic acid (a) per 1 equivalent of epoxide group of the mixture of diepoxide (b) and triepoxide compound.

15. A composition according to claim 1 which contains a polyester-polyamide-dicarboxylic acid (a) wherein the polyester radical A is derived from an aliphatic dicarboxylic acid having at least 6 carbon atoms.

16. A composition according to claim 1 which contains a polyester-polyamide-dicarboxylic acid (a) the polyester radical $A_1$ of which is derived from an acid polyester of formula

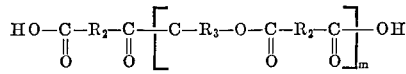

wherein $R_2$ and $R_3$ represent branched or unbranched alkylene or branched or unbranched alkenylene chains, with the proviso that each of the two radicals $R_2$ and $R_3$ must contain at least such a number of carbon atoms that the sum of the carbon atoms in $R_2$ and $R_3$ together is at least 6 and at most 64, and wherein the number $m$ is so chosen that the product of $m$ and of the sum (C atoms in $R_2$+C atoms in $R_3$) is at least 25.

17. A composition according to claim 1 which contains polyester-polyamide-dicarboxylic acid (a) the polyester radical $A_1$ of which is derived from an acid polyester of formula

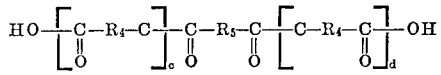

wherein $R_4$ represents an alkylene chain having at least 3 and at most 32 carbon atoms, $R_5$ represents an aliphatic hydrocarbon radical, and the numbers $c$ and $d$ are so chosen that the product of $(c+d)$ and of the sum (C atoms in $R_4$) is at least 25.

References Cited

UNITED STATES PATENTS

| | | | |
|---|---|---|---|
| 3,408,421 | 10/1968 | Kurka | 260—835 |
| 3,427,255 | 2/1969 | Case | 260—75 EP |

FOREIGN PATENTS

| | | | |
|---|---|---|---|
| 520,140 | 12/1955 | Canada | 260—835 |
| 694,282 | 9/1964 | Canada | 260—835 |
| 704,008 | 2/1954 | Great Britain | 260—835 |

JOHN C. BLEUTGE, Primary Examiner

U.S. Cl. X.R.

260—2.5, 40, 45.95, 485, 830

PO-1050 (5/69)

UNITED STATES PATENT OFFICE
CERTIFICATE OF CORRECTION

6370/1+2/E

Patent No. 3,629,226    Dated December 21, 1971

Inventor(s) FRIEDRICH LOHSE ET AL

It is certified that error appears in the above-identified patent and that said Letters Patent are hereby corrected as shown below:

Column 22, lines 56-59, amend the left side of the formula to read:

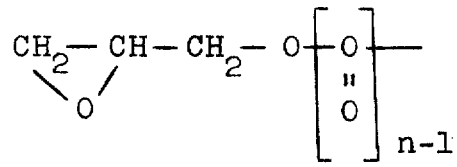

Column 23, lines 32-35, amend the middle of the formula to read:

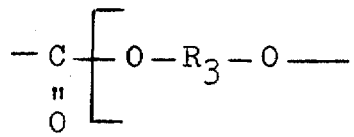

Column 24, lines 13-15, amend the formula to read:

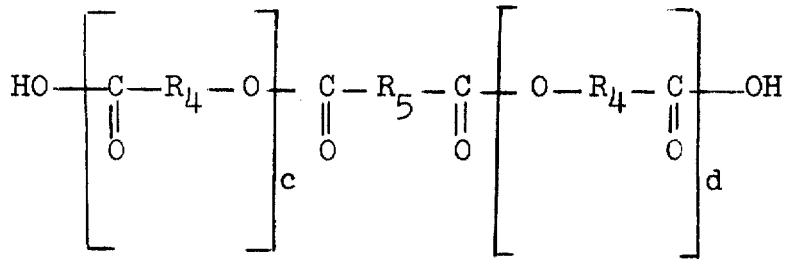

Signed and sealed this 27th day of June 1972.

(SEAL)
Attest:

EDWARD M. FLETCHER, JR.  ROBERT GOTTSCHALK
Attesting Officer    Commissioner of Patents